Nov. 17, 1953    F. F. KISHLINE ET AL    2,659,619
RESILIENT CONNECTION
Filed Jan. 24, 1947
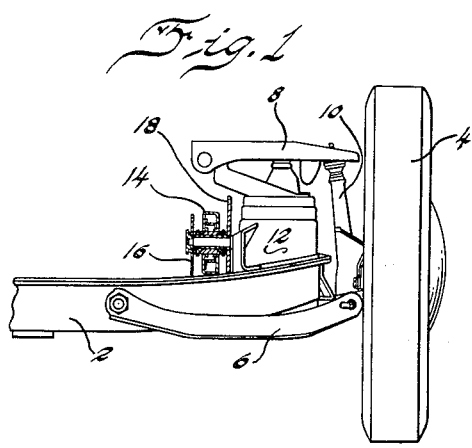
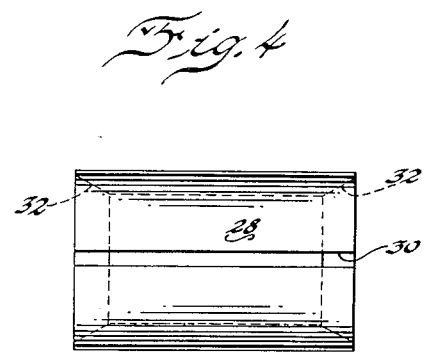
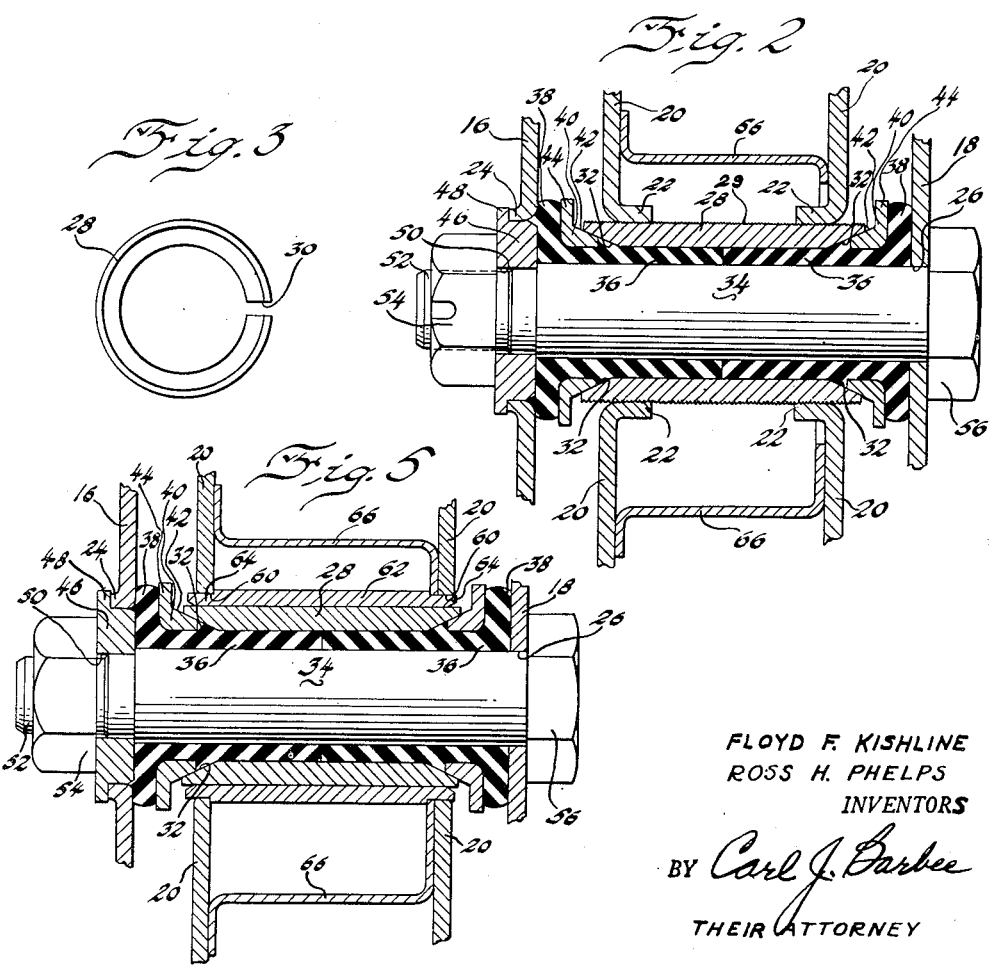
FLOYD F. KISHLINE
ROSS H. PHELPS
INVENTORS
BY Carl J. Barbee
THEIR ATTORNEY

Patented Nov. 17, 1953

2,659,619

UNITED STATES PATENT OFFICE 2,659,619

RESILIENT CONNECTION

Floyd F. Kishline and Ross H. Phelps, Kenosha, Wis., assignors to Nash-Kelvinator Corporation, Kenosha, Wis., a corporation of Maryland Application January 24, 1947, Serial No. 723,976

6 Claims. (Cl. 287—85)

This invention generally relates to resilient connections and more particularly to resilient connection means for use in connecting members of a motor vehicle together.

It is an object of this invention to provide a resilient connection wherein mechanical means and fluid rubber means are utilized to form and maintain the connection.

It is another object of this invention to provide a resilient connection which will require no lubrication or other attention after assembly thereof.

It is a further object of this invention to provide a resilient connection which is simple in design, easy to assemble and economical to manufacture.

Further objects and advantages of this invention will be apparent from a consideration of the following specification, claims and drawings in which like reference characters are used to designate similar parts, and in which:

Figure 1 is a front elevational view partially in section of a frame cross member of a motor vehicle with a front suspension unit supporting said member and showing the invention as associated with said cross member and a vehicle frame member;

Figure 2 is a sectional view of the invention as shown in Figure 1;

Figure 3 is an end view of one part of the invention;

Figure 4 is a side elevational view of the part shown in Figure 3; and

Figure 5 is a sectional view of a modification of the invention shown in Figure 2.

The present invention is a resilient connection for connecting a vehicle frame cross member to a vehicle frame side rail in such a manner that shocks and vibrations will not be transmitted from the cross member to the side rail.

Illustrated in Figure 1 is a frame cross member 2 on the outer end of which is carried a suspension unit for the vehicle wheel 4. The suspension unit is generally comprised of a lower control arm 6, an upper control arm 8, and a wheel spindle carrying member 10 which is pivotally secured between the outer ends of arms 6 and 8. A spring means (not shown) is carried by arm 6 and extends upwardly into tower 12 which is rigidly secured to the cross member 2.

The present invention provides a resilient connection between the cross member 2 and the frame side rail 14 by connecting rail 14 to a bracket 16 rigidly secured to the top of cross member 2 and the wheel panel 18 likewise rigidly secured to the top of cross member 2. As shown in Figure 2, side rail 14 is composed of a pair of side members 20 which are provided with aligned apertures defined by flanges 22. Bracket 16 is provided with an aperture aligned with the apertures in members 20 and defined by flange 24. Wheel panel 18 is provided with an aperture 26 aligned with the apertures in members 20 and bracket 16. Within the apertures defined by flanges 22 is positioned a metal sleeve 28 which is split longitudinally as at 30 (Figures 3 and 4) and has interiorly tapered portions 32 formed adjacent the ends thereof. A bolt 34 extends through aperture 26 in wheel panel 18, the aligned apertures defined by flanges 22 and the aperture defined by flange 24. A pair of resilient bushings 36 are telescopically positioned around bolt 34 and have radially extending annular flanges 38 formed on the outer ends thereof. One of the flanges 38 is positioned adjacent the inner side of wheel panel 18 and the other flange 38 is positioned adjacent the inner side of bracket 16. The cylindrical portions of bushings 36 extend between the outer surface of bolt 34 and the inner surface of sleeve 28. Around bushings 36 adjacent the inner sides of flanges 38 are positioned a pair of plugs or collars 40 each having a tapered exterior surface 42 and a retaining flange 44 of greater diameter than the diameter of sleeve 28. Tapered portions 42 of the members 40 are designed to engage the interiorly tapered portions 32 formed in the ends of sleeve 28. A sleeve 46 is positioned within the aperture defined by flange 24 and is provided with a flange 48 of greater diameter than the aperture formed by flange 24 and further provided with an aperture 50 through which the end of bolt 34 extends to its threaded end 52 on which is turned a nut 54 into engagement with the outer side of sleeve 46. A flanged strengthening member 66 is rigidly secured to the inner walls of members 20 and extends therebetween.

When all the parts of the invention are assembled as described above and shown in Figure 2, the turning of nut 54 on the threaded end 52 of bolt 34 will shorten the distance between the nut 54 and the head 56 of bolt 34 and thus pull bracket 16 and wheel panel 18 inwardly toward each other which will compress flanges 38 of the bushings 36 and tend to force the tapered surfaces 42 of the plugs 40 into engagement with the tapered surfaces 32 of the sleeve 28 and thus expand the sleeve 28 into more solid engagement with the flanges 22 of the side rail 14. The expansion of sleeve 28 is also caused by the compression of the bushings 36 and said expansion is facilitated by the provision of the longitudinal split 30 in the sleeve 28. The more nut 54 is turned on the bolt 34, the more bushings 36 will be compressed and the further the plugs 40 will be pushed into the ends of the sleeve 28.

Sleeve 28 may be threaded on its outer surface as shown at 29 in Figure 2. Such threading of sleeve 28 provides a better connection between said sleeve and flanges 22 of side rail 14 so there will be less danger of sleeve 28 moving longitudinally in relation to rail 14 after the invention is assembled.

The modification of this invention is shown in Figure 5 in which aligned apertures 60 of rail 14 are not defined by flanges such as flanges 22 of Figure 2 but a sleeve 62 having reduced end portions 64 of slightly less diameter than the diameter of aperture 60 is pushed with portions 64 within said apertures 60. Within sleeve 62 is pushed the sleeve 28 which is of slightly less diameter than the inside diameter of sleeve 62. Sleeve 28 is expanded into frictional engagement with sleeve 62 in the same manner as described above where the sleeve 28 is expanded into engagement with the flanges 22.

In the manner described above we have provided a resilient connection for use in connecting parts of a motor vehicle so that vibrations, etc. arising in one or the other part will not be transmitted to the associated part.

While we have described our invention in some detail, this description is not to be taken as limiting the invention. All equivalents falling within the scope of the appended claims are reserved.

What is claimed is:

1. A resilient connection comprising spaced support members having aligned apertures, a bolt extending through said apertures, a resilient sleeve telescopically positioned on said bolt and having radially extending flanges adjacent the inner sides of said support members, a longitudinally split cylindrical member surrounding said resilient sleeve and having internally tapered end portions, tapered plugs telescopically positioned around said sleeve adjacent the inner sides of said flanges and pressed into said tapered end portions of said cylindrical member to expand same, and a supported member telescopically positioned around said cylindrical member.

2. A resilient mounting for a member having aligned apertures comprising spaced support members having aligned apertures, a bolt extending through said apertures, a nut turned on the threaded end of said bolt against the outer side of one of said support members, a resilient sleeve telescopically positioned on said bolt between said support members and having radially extending flanges adjacent the inner sides of said support members, tapered plugs telescopically positioned around said sleeve adjacent the inner sides of both said flanges, a longitudinally split cylindrical member surrounding said resilient sleeve and having internally tapered end portions engaged by said tapered plugs to expand said cylindrical member when said tapered plugs are moved inwardly by turning said nut on the end of said bolt.

3. A resilient mounting for a supported member having aligned apertures comprising a pair of support members one of each of which is positioned on either side of said member, a bolt extending through said apertures having its head abutting the outer side of one of said support members, a nut turned on said bolt against the outside of the other of said support members, a centrally divided resilient bushing positioned on said bolt between said support members and compressed when said nut is turned on said bolt beyond a predetermined distance, radially extending flanges formed around the outer ends of said bushing adjacent the inner sides of said support members, tapered plugs telescopically positioned around said bushing adjacent the inner sides of each of said flanges, and a longitudinally split cylindrical member having internally tapered ends engaged by said tapered plugs when said nut is turned on said bolt beyond a predetermined distance for expanding said cylindrical member into engagement with said supported member.

4. A resilient mounting for a member to be supported, said member having aligned apertures formed therein, a longitudinally split cylindrical member having interiorly tapered ends positioned within said apertures, a pair of support members one of each of which is positioned on either side of the member to be supported, aligned apertures formed in said support members, a bolt extending through the apertures in said support members and through said cylindrical member having its head abutting the outer side of one of said support members and a nut turned on its opposite end against the outer side of the other of said support members, a resilient bushing telescopically positioned around said bolt, radially extending flanges formed on said bushing adjacent the inner sides of said support members, and tapered plugs engaging the tapered ends of said cylindrical member when said nut is turned on said bolt beyond a predetermined distance to expand said cylindrical member into engagement with the member to be supported.

5. A resilient mounting for a member to be supported having aligned apertures formed therein comprising a longitudinally split cylindrical member positioned within said apertures and having interiorly tapered ends, a pair of support members one of each of which is positioned on either side of said member to be supported, aligned apertures formed in said support members, a bolt extending through the apertures in said support members and through said cylindrical member, a resilient cylindrical member telescopically positioned on said bolt between said support members and compressed to expand said cylindrical member into engagement with said member to be supported, radially extending flanges formed on the outer ends of said resilient member adjacent the inner sides of said support members, tapered plugs telescopically positioned on said resilient member adjacent the inner sides of the flanges thereof and pressed into engagement with the tapered ends of said cylindrical member to expand same into engagement with the member to be supported.

6. A resilient connection comprising spaced support members having aligned apertures, a bolt extending through said apertures, resilient means telescopically positioned on said bolt and having radially extending flanges adjacent the inner sides of said support members, a longitudinally split externally threaded cylindrical member surrounding said resilient means and having internally tapered end portions, tapered plugs telescopically positioned around said resilient means adjacent the inner sides of said flanges and pressed into the tapered end portions of said cylindrical member to expand same, and a supported member telescopically positioned around said cylindrical member.

FLOYD F. KISHLINE.
ROSS H. PHELPS.

References Cited in the file of this patent

UNITED STATES PATENTS

| Number | Name | Date |
|---|---|---|
| 475,509 | Lines | May 24, 1892 |
| 1,750,346 | Chilton | Mar. 11, 1930 |
| 1,871,918 | Rossman | Aug. 16, 1932 |
| 1,931,945 | Zerk | Oct. 24, 1933 |
| 1,954,277 | Zerk | Apr. 10, 1934 |
| 1,958,141 | Haushalter | May 8, 1934 |
| 1,993,631 | Piquerez | Feb. 26, 1935 |
| 2,095,947 | Herold | Oct. 12, 1937 |
| 2,188,952 | Leighton | Feb. 6, 1940 |
| 2,207,831 | Sherman | July 16, 1940 |
| 2,240,709 | Mead | May 6, 1941 |
| 2,351,291 | Ross | June 13, 1944 |
| 2,390,168 | Piot | Dec. 4, 1945 |
| 2,396,848 | Haushalter | Mar. 19, 1946 |
| 2,416,243 | Thiry | Feb. 18, 1947 |

FOREIGN PATENTS

| Number | Country | Date |
|---|---|---|
| 213,019 | Great Britain | Mar. 27, 1924 |